United States Patent [19]

Adams et al.

[11] Patent Number: 4,919,964
[45] Date of Patent: Apr. 24, 1990

[54] SHELF STABLE, HIGHLY AERATED REDUCED CALORIE FOOD PRODUCTS

[75] Inventors: Keith D. Adams; Dana P. Gruenbacher; Kathleen H. Noble, all of Cincinnati, Ohio

[73] Assignee: The Procter & Gamble Company, Cincinnati, Ohio

[21] Appl. No.: 288,846

[22] Filed: Dec. 22, 1988

[51] Int. Cl.$^5$ .......................... A23D 3/00; A23D 5/00
[52] U.S. Cl. ..................... 426/564; 426/602; 426/603; 426/604; 426/606; 426/607; 426/611; 426/613; 426/804; 260/410; 260/410.6; 514/558; 514/23; 514/552
[58] Field of Search ................. 426/601–606, 426/611, 613, 804, 609, 564; 260/410, 410.6; 514/558, 23, 552; 536/119

[56] References Cited

U.S. PATENT DOCUMENTS

| | | |
|---|---|---|
| 2,831,854 | 4/1958 | Tucker et al. |
| 2,874,175 | 2/1959 | Feuge et al. |
| 2,962,419 | 11/1960 | Minich |
| 3,194,666 | 7/1965 | Bedenk et al. |
| 3,253,928 | 5/1966 | Bedenk et al. |
| 3,549,387 | 12/1970 | Howard |
| 3,579,548 | 5/1971 | Whyte |
| 3,597,233 | 8/1971 | Patterson |
| 3,600,186 | 8/1971 | Mattson et al. |
| 3,628,968 | 12/1971 | Noznick et al. |
| 3,751,265 | 8/1973 | Seiden |
| 3,809,764 | 5/1974 | Gabby et al. |
| 3,932,532 | 1/1976 | Hunter et al. |
| 3,963,699 | 6/1976 | Rizzi |
| 4,005,195 | 1/1977 | Jandacek |
| 4,005,196 | 1/1977 | Jandacek et al. |
| 4,508,746 | 4/1985 | Hamm |
| 4,517,360 | 5/1985 | Volpenhein |
| 4,518,772 | 5/1985 | Volpenhein |
| 4,582,927 | 4/1986 | Fulcher |
| 4,626,441 | 12/1986 | Wolkstein ............ 426/548 |
| 4,797,300 | 1/1989 | Jandacek et al. ............ 426/549 |

FOREIGN PATENT DOCUMENTS 0233856 9/1987 European Pat. Off.
0236288 9/1987 European Pat. Off.
207070 2/1984 German Democratic Rep.

OTHER PUBLICATIONS

U.S. Ser. No. 175,004, CIP of U.S. Ser. No. 47,367 (Guffey et al.)–Filed 4/12/88 and 5/6/87.
U.S. Ser. No. 176,712 CIP of U.S. Ser. No. 47,367 (Orphanos et al.), Filed 4/15/88 and 5/6/87.
Chemistry and Physics of Lipids, 22, pp. 163–176, Elsevier/North Holland Scientific Publishers Ltd. (Jandacek et al.)–1978.
Olestra Food Additive Petition (Procter & Gamble), Filed with FDA, 5/7/87 parts made public.
Commercial Shortenings.
American Journal of Clinical Nutrition, 29, pp. 1204–1215 (Fallet et al.) (11/76).
Shortening/General Information, pp. 1–6 (Gerstenberg & Agger A/S)–4/6/84.
Applewhite, Bailey's Industrial Oil and Fat Products, 4th ed., vol. 3, pp. 100–104, John Wiley & Sons, New York–1985.
Inside R&D (pp. 5–6)–5/20/87.
U.S. Ser. No. 287,247 (Whelan et al.), Filed 12/20/88.

Primary Examiner—Jeanette Hunter
Attorney, Agent, or Firm—Gary M. Sutter; Julius P. Filcik; Richard C. Witte

[57] ABSTRACT

The invention relates to a highly aerated fatty composition and food products made therefrom that are smooth and creamy, storage stable, and resistant to slump and collapse. The fatty composition comprises at least about 5% by weight fat substitute selected from sugar fatty acid esters and sugar alcohol fatty acid esters, where the sugars and sugar alcohols contain from 4 to 8 hydroxyl groups, and where each fatty acid group has from about 2 to about 24 carbon atoms. The fatty composition is aerated to contain from 5% to 75% by volume edible gas dispersed uniformly in the composition.

21 Claims, No Drawings

SHELF STABLE, HIGHLY AERATED REDUCED CALORIE FOOD PRODUCTS

TECHNICAL FIELD

The present invention relates to aerated food products. More particularly, the invention relates to a fatty composition which is capable of producing highly stable, highly aerated reduced calorie food products.

BACKGROUND OF THE INVENTION

Plastic triglyceride shortening compositions are commonly aerated with an innocuous gas such as nitrogen or air. By incorporating an aerating gas into the shortening in the form of uniformly dispersed very small bubbles, a white opaque product of pleasing appearance is obtained. Additionally, aeration can lead to a softer product with an extended plastic range (i.e. the temperature range over which the product deforms easily without being fluid).

Conventional methods for producing plastic shortenings involve the steps of heating the shortening to a temperature above the melting point of its solid components to form a liquid fat, rapidly chilling the liquid fat in a scraped surface heat exchanger to produce crystal nuclei, passing the fat through a crystallizing unit where crystallization is allowed to continue with mild agitation, and storing at constant temperature in a final crystallization step known as tempering. The aerating gas is injected into the fat prior to the chilling process and the fat is maintained under high pressure during the chilling and subsequent crystallization stage so that the injected gas is maintained in solution during these processes. After leaving the crystallizing unit the fat is passed through a suitable throttle valve where the pressure is released and the dissolved gas comes out of solution and is dispersed as minute bubbles.

The amount of gas which can be incorporated into plastic triglyceride shortening by the conventional process described above is limited. Although up to about 22 volume percent of gas can be incorporated in shortening by the conventional process, high levels of gas (e.g., 15%-22%) can give a coarse dispersion or a streaked product.

It would be desirable to incorporate higher levels of gas into shortenings and other fatty compositions for several reasons. Increased aeration of such a composition will decrease the net weight per unit volume that a person ingests, thereby reducing the number of calories. Additionally, such a composition will be more economical to produce, and it will have a light, fluffy texture.

Certain types of icings, generally known as cream or butter-cream icings, contain a substantial proportion of triglyceride fat or shortening and can be whipped to incorporate an appreciable volume of air or nitrogen. Although such icings initially have an attractive appearance and structure, they frequently tend to be unstable over relatively short periods of time. That is, they are subject to excessive drying, firming, or hardening, and tend to bleed oil, slump or collapse.

There have been various attempts to solve the problems related to highly aerated shortenings and highly aerated shortening-containing icings. For example, U.S. Pat. 3,549,387 of Howard, issued Dec. 22, 1970, discloses a special process for preparing aerated plastic shortenings in which gas is introduced into the shortening after the tempering step, instead of prior to the chilling step. The product, which can contain between 5% and 50% by volume of air, is said to have improved creaming properties.

U.S. Pat. No. 3,253,928 of Bedenk et al., issued May 31, 1966, discloses improved aerated cream icings. The icings are prepared by employing a plastic shortening made from a mixture of partially hydrogenated triglyceride and substantially completely hydrogenated triglyceride hardstock having a predominant beta-phase crystalline structure.

However, there is still a need for further improvement in aerated shortenings, cream icings, and other fatty compositions. One reason is that triglyceride fats are very high in calories. A triglyceride shortening containing up to 50% by volume of air, as described in the Howard patent, will still contain a considerable number of calories. It would be desirable to make an aerated fatty composition that is lower in calories by a reduction in the amount of triglyceride fat and also by an ability to hold more than 50% by volume of air.

Sugar and sugar alcohol fatty acid polyesters are known in the art as a low calorie replacement for normal triglyceride fat in food products. U.S. Pat. No. 3,600,186 of Mattson et al., issued August 17, 1971, discloses the use of sugar and sugar alcohol fatty acid polyesters as a fat replacement in foods such as shortenings, margarines, mayonnaise, and salad or cooking oils. Highly aerated fatty compositions are not mentioned.

It is an object of the present invention to provide a highly aerated, low calorie fatty composition.

It is also an object of the present invention to provide reduced calorie, highly aerated fatty composition-containing food products which are shelf stable and resistant to slump and collapse.

These and other objects of the present invention will become evident from the disclosure herein.

All parts, percentages and ratios used herein are by weight unless otherwise indicated.

SUMMARY OF THE INVENTION

The invention relates to a highly aerated fatty composition and food products made therefrom that are smooth and creamy, storage stable, and resistant to slump and collapse. The fatty composition comprises at least about 5% by weight fat substitute selected from the group consisting of sugar fatty acid esters and sugar alcohol fatty acid esters, and mixtures thereof, wherein the sugars and sugar alcohols contain from 4 to 8 hydroxyl groups, and wherein each fatty acid group has from about 2 to about 24 carbon atoms; the balance of the fatty composition comprising conventional fatty composition ingredients. The fatty composition is aerated to contain from about 5% to about 95% by volume edible gas dispersed uniformly in the composition.

DETAILED DESCRIPTION OF THE INVENTION

The present invention relates to fatty composition-containing highly aerated food products which are highly storage stable. It has now been surprisingly discovered that fatty compositions made with certain sugar or sugar alcohol fatty acid esters are more capable of being highly aerated than conventional triglyceride shortenings. This discovery allows the production of highly aerated fatty composition-containing food products such as frostings, mousses, dessert toppings, vegetable toppings and table spreads which are uniform in nitrogen dispersion and largely resistant to slump and collapse at room temperature for up to six months. The highly aerated food products are found to have a unique, very light, fluffy texture and a uniform, smooth and creamy appearance. The incorporated gas breaks up the crystal structure of the products, providing improved spreadability.

In addition to the texture and appearance advantages, use of the sugar or sugar alcohol fatty acid poly esters also allows a reduction in calories of the food products, because the esters are not capable of being absorbed in the digestive tract. On a volume basis, the incorporation of high levels of gas further decreases calories.

Moreover, in contrast to butter and margarine, the table spreads and other food products of the present invention do not require the addition of water. In the absence of water, the spreads are more biologically stable, and the flavor is believed to be released better. The fatty composition and foods of the invention are particularly suitable for use in the foodservice industry, because the products are highly stable and can be easily scooped from larger containers.

The present fatty composition comprises from about 5% to about 95% by volume edible gas dispersed uniformly in the composition. The composition also comprises at least 5% by weight fat substitute selected from the group consisting of sugar fatty acid esters and sugar alcohol fatty acid esters, and mixtures thereof, wherein the sugars and sugar alcohols contain from 4 to 8 hydroxyl groups, and wherein each fatty acid group has from about 2 to about 24 carbon atoms. The balance of the fatty composition comprises conventional fatty composition ingredients such as triglyceride fats.

SUGAR AND SUGAR ALCOHOL FATTY ACID ESTERS

The term "sugar" is used herein in its conventional sense as generic to mono- and disaccharides. The term "sugar alcohol" is also used in its conventional sense as generic to the reduction product of sugars wherein the aldehyde or ketone group has been reduced to an alcohol. Suitable for use in the present invention are sugars and sugar alcohols containing at least 4 hydroxyl groups. The fatty acid ester compounds are prepared by reacting a monosaccharide, disaccharide or sugar alcohol with fatty acids as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e. erythritol, contains 4 hydroxyl groups and is thus suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups.

In preparing sugar or sugar alcohol fatty acid esters of the present invention a sugar or sugar alcohol compound such as those identified above must be esterified with fatty acids having from about 2 to about 24 carbon atoms, preferably from about 4 to about 24 carbon atoms, and most preferably from 8 to 22 carbon atoms. Examples of such fatty acids are caprylic, capric, lauric, myristic, myristoleic, palmitic, palmitoleic, stearic, oleic, linoleic, linolenic, eleostearic, arachidic, behenic, and erucic. The fatty acids can be derived from suitable naturally occurring or synthetic fatty acids and can be saturated or unsaturated, including positional and geometric isomers (e.g., cis and trans isomers).

The fatty composition of the present invention comprises at least about 5% by weight sugar or sugar alcohol polyesters, preferably at least about 20%, and more preferably between about 20% and about 55%. The polyesters are critical for providing the good aeration properties of the present fatty composition.

The sugar or sugar alcohol fatty acid esters suitable for use herein can be prepared by a variety of methods well known to those skilled in the art. These methods include: transesterification of the sugar or sugar alcohol with methyl, ethyl or glycerol fatty acid esters using a variety of catalysts; acylation of the sugar or sugar alcohol with a fatty acid chloride; acylation of the sugar or sugar alcohol with a fatty acid anhydride; and acylation of the sugar or sugar alcohol with a fatty acid, per se. As an example, the preparation of sugar and sugar alcohol fatty acid esters is described in U.S. Pat. No. 2,831,854, 3,600,186, 3,963,699, 4,517,360, and 4,518,772, all incorporated by reference herein.

A characterizing feature of the sugar or sugar alcohol fatty acid esters useful in this invention is that they must contain at least 4 fatty acid ester groups. Sugar or sugar alcohol fatty acid ester compounds that contain 3 or less fatty acid ester groups are digested in the intestinal tract much in the manner as ordinary triglyceride fats, but sugar or sugar alcohol fatty acid ester compounds that contain four or more fatty acid ester groups are digested to a lesser extent and thus have the desired low calorie properties for use in this invention.

The sugar and sugar alcohol fatty acid esters can be intermediate melting, solids or liquids. By "intermediate melting" as used herein is meant that the polyol fatty acid polyesters have an iodine value between about 25 and about 55, and preferably between about 36 and about 55. A preferred method of preparing intermediate melting polyesters is to esterify a sugar or sugar alcohol with a mixture of partially hydrogenated and nearly completely hydrogenated soybean oil methyl esters.

Liquid sugar or sugar alcohol fatty acid polyesters have an iodine value between about 60 and about 130. In order to provide liquid polyesters at least about half of the fatty acids incorporated into a polyol molecule must be unsaturated. Oleic and linoleic acids, and mixtures thereof, are especially preferred. The following are non-limiting examples of specific liquid polyol fatty acid polyesters: sucrose heptaoleate, sucrose octaoleate, the glucose tetraesters of soybean oil fatty acids (unsaturated), sorbitol tetraoleate, the sorbitol hexaesters of unsaturated soybean oil fatty acids, xylitol pentaoleate, and mixtures thereof. Liquid polyesters can function as soft oils.

Solid sugar or sugar alcohol fatty acid polyesters have an iodine value not more than about 12. The solid polyesters contain fatty acid chains that are more saturated than unsaturated, and more longer than shorter fatty acid chains. Typical examples of solid polyesters include sucrose octastearate, sucrose octapalmitate, xylitol pentapalmitate, galactose pentapalmitate, and the like. The solid polyesters can function as hardstocks.

It is known that liquid polyol fatty acid polyesters can cause an undesired anal leakage effect. U.S. Pat. No. 4,005,195 of Jandacek and U.S. Pat. No. 4,005,196 of Jandacek et al., both incorporated by reference herein, disclose a method of avoiding this problem by the addition of anti-anal leakage agents to the liquid polyesters. Therefore, liquid sugar and sugar alcohol fatty acid esters according to the present invention preferably additionally comprise sufficient anti-anal leakage agent to prevent leakage of the esters. Preferably there is present at least about 3% anti-anal leakage agent by weight of the esters, more preferably between about 3% and about 10%.

Polyol fatty acid esters having a high liquid/solid stability have been found to be highly resistant to anal leakage. By "liquid/solid stability" is meant that the liquid portion of the esters does not readily separate from the solid portion. The present sugar and sugar alcohol fatty acid esters preferably have a liquid/solid stability of at least about 30%, more preferably at least about 50%, more preferably at least about 70%, and most preferably at least about 90%. A minimum solids content in the sugar and sugar alcohol fatty acid esters is also preferred for anti-anal leakage control. The esters preferably have a solid fat content of at least about 3% at 100° F. (37.8° C.), more preferably between about 3% and about 10%. The preferred maximum solid fat content at 100° F. (37.8° C.) is about 30%.

It is also preferred that the esters have a viscosity at 100° F. (37.8°) of at least about 0.5 poise after 10 minutes of steady shear at a shear rate of 10 seconds$^{-1}$, more preferably at least about 5 poise, and most preferably at least about 15 poise. The preferred upper limit of the viscosity of these esters is about 800 poise after 10 minutes of shear at a shear rate of 10 seconds$^{-1}$.

Highly preferred sugar or sugar alcohol fatty acid esters for use in the present invention are sucrose fatty acid esters. Preferred sucrose fatty acid esters have the majority of their hydroxyl groups esterified with fatty acids. Preferably at least about 85%, and most preferably at least about 95%, of the sucrose fatty acid esters are selected from the group consisting of octaesters, heptaesters and hexaesters, and mixtures thereof. Preferably, no more than about 35% of the esters are hexaesters or heptaesters, and at least about 60% of the sucrose fatty acid polyesters are octaesters. Most preferably, at least about 70% of the esters are octaesters. It is also most preferred that the esters have a total content of penta- and lower esters of not more than about 3%.

The preferred iodine value of the sucrose fatty acid esters is between about 10 and about 60, more preferably between about 25 and about 60.

CONVENTIONAL FATTY COMPOSITION INGREDIENTS

In addition to the sugar or sugar alcohol fatty acid polyesters, the remainder of the fatty composition of the present invention comprises conventional fatty composition ingredients, such as ingredients that are found in shortening or oil products. These ingredients include triglyceride fats and/or fat substitutes. Preferably, the present fatty composition comprises from about 20% to about 55% sugar or sugar alcohol polyesters and from about 45% to about 80% triglyceride fats, more preferably from about 25% to about 50% polyesters and from about 50% to about 75% triglycerides, and most preferably from about 30% to about 45% polyesters and from about 55% to about 70% triglycerides. The triglyceride fats can be soft oils, hardstock fats, and/or intermediate melting triglycerides.

Suitable soft oils have an iodine value between about 70 and about 130. Triglyceride soft oils can be derived from animal, vegetable or marine sources, including naturally occurring oils such as cottonseed oil, soybean oil, rapeseed oil, low erucic acid rapeseed oil, canola oil, sunflower oil, corn oil, peanut oil, safflower oil, and the like, or mixtures thereof. Liquid soybean oil is the preferred soft oil.

Triglyceride hardstock fats are substantially completely hydrogenated triglyceride fats or oils having an iodine value not exceeding about 12. The hardstock fat can be obtained by hydrogenating naturally occurring oils such as palm oil, cottonseed oil, sunflower oil, corn oil, peanut oil, and the like, or mixtures thereof. Palm oil is preferred for use as the hardstock fat.

Suitable intermediate melting triglycerides have an iodine value between about 25 and about 60. Triglyceride oils which can be hydrogenated to yield an intermediate melting fat are soybean oil, palm oil, cottonseed oil, peanut oil, coconut oil, and the like, or mixtures thereof. Rearranged fats or oils prepared by interesterification can also be used herein. Preferred intermediate melting fats are hydrogenated to an iodine value of about 35 to about 55.

Many classes of reduced calorie fat substitutes, or mixtures thereof, are suitable for use in the present fatty composition, to make up all or part of the fatty composition that does not consist of sugar or sugar alcohol esters. Examples of such materials are: fatty alcohol esters of polycarboxylic acids (U.S. Pat. No. 4,508,746 to Hamm, assigned to CPC International, Inc., issued Apr. 2, 1985); fatty polyethers of polyglycerol (U.S. Pat. No. 3,932,532 of Hunter et al., assigned to ICI United States, Inc., issued Jan. 13, 1976) (food use disclosed in German Patent No. 207,070, issued Feb. 15, 1984)); ethers and ether-esters of polyols containing the neopentyl moiety (U.S. Pat. No. 2,962,419 of Minich, issued Nov. 29, 1960); fatty alcohol diesters of dicarboxylic acids such as malonic and succinic acid (U.S. Pat. No. 4,582,927 of Fulcher, assigned to Frito-Lay, Inc., issued Apr. 15, 1986); triglyceride esters of alpha branched chain-alkyl-carboxylic acids (U.S. Pat. 3,579,548 of Whyte, assigned to The Procter & Gamble Co., issued May 18, 1971); fatty acid diglyceride, diesters of dibasic acids (U.S. Pat. No. 2,874,175 to Feuge et al.); polyorganosiloxanes (European Patent Application No. 205,273 to Frye); and alpha-acylated glycerides (U.S. Pat. No. 4,582,715 to Volpenhein), all incorporated herein by reference. Also suitable for use as a fat substitute in the present invention are medium chain triglycerides, highly esterified polyglycerol esters, acetin fats, plant sterol esters, N-Oil, polyoxyethylene esters, jojoba esters, mono/diglycerides of fatty acids, mono/diglycerides of short-chain dibasic acids, silicone oils/siloxanes (see, e.g., European Patent Application No. 205,273 of Dow Corp., incorporated by reference herein), and "Olestrin" (Reach Assoc., Inc.), made by particle engineering dextrins and adding them to a fat substitute.

These oils and the present fatty composition can be processed with one or more of the following processes: hydrogenation, winterization, dewaxing, interesterification, or another standard processing method.

Various additives can be used in the present fatty composition provided that they are edible and aesthetically desirable and do not have any detrimental effects on the composition. The composition can normally contain minor amounts of optional flavorings, colorings, emulsifiers, anti-spattering agents, anti-sticking agents, anti-oxidants, or the like. If the fatty composition is to be used in baked goods, it preferably comprises from about 1% to about 7% emulsifier. Mono- and diglycerides are the preferred emulsifier. Another preferred emulsifier is lower sucrose fatty acid esters (mono-, di-, and triesters).

A preferred shortening according to the present invention comprises from about 10% to about 50% by weight intermediate melting sugar or sugar alcohol fatty acid polyesters, from about 5% to about 15% hardstock (hardstock triglycerides and/or solid sugar or sugar alcohol fatty acid polyesters), from about 40% to about 80% soft oil liquid (triglycerides and/or liquid sugar or sugar alcohol fatty acid polyesters), and from about 1% to about 10% emulsifier.

METHOD FOR AERATING THE FATTY COMPOSITION

The fatty composition of the present invention is prepared by any conventional process, such as the described at pages 1-2 hereinabove as standard to the art. The processing of plastic shortenings is described in Applewhite, *Bailey's Industrial Oil and Fat Products.* 4th Edition, Vol. 3, pp. 100-104, John Wiley & Sons, New York (1985), incorporated by reference herein. An illustration is shown of a Cherry-Burrell chilling and plasticizing system for shortening (Cherry-Burrell, Anco/-Votator Division, Louisville, Ky.). Preferred equipment for high levels of aeration is a Gerstenberg & Agger high pressure nitrogen injection system (Gerstenberg & Agger Co., 19, Frydendalsvej, DK 1800 Copenhagen V, Denmark).

The edible gas employed in aerating the fatty composition can be any of the usual innocuous, edible gases such as air, nitrogen, carbon dioxide, other inert gases, nitrous oxide, or octafluorocyclobutane. The invention is not limited by the type of gas used.

The amount of gas injected into the fatty composition is adjusted so that the final product comprises from about 5% to about 95% by volume of gas. Preferred aerated fatty compositions according to the invention comprise from about 25% to about 75% by volume edible gas, more preferably from about 35% to about 65%, and most preferably from about 40% to about 60%. These volumes are measured at room temperature of 70° F. (21° C.). After aeration, the fatty composition can be packed in standard containers, tempered, and stored for use.

FOOD PRODUCTS OF THE INVENTION

The fatty composition of the invention can be used alone as an improved aerated fatty composition such as a shortening, and it can also be used to make storage stable aerated food products. The food products comprise at least about 10% by weight fatty composition of the present invention, preferably at least about 20%, more preferably at least about 50%, and most preferably at least about 80%. Preferred aerated food products according to the invention are selected from the group consisting of vegetable toppings, table spreads, dessert toppings, mousses, frostings, custards, puddings, dessert fillings, frozen desserts, confectionery fillings, cream cheese, processed meats, snack dips, and snack toppings.

The table spreads include imitation butter or imitation peanut butter. Preferably, the spreads are butter flavored. Being more highly aerated, the spreads are more easily spreadable than conventional table spreads. The vegetable toppings include imitation sour cream, including sour cream and chives-flavored toppings.

The frostings, or icings, are cream frostings which contain a substantial amount of fatty composition. The dessert toppings include imitation whipped cream, for example, a Cool Whip-type product, and other whipped toppings.

Frozen desserts include dairy and non-dairy frozen desserts, such as imitation ice creams, ice milks, sherbets, frozen custards, frozen yogurts, mellorines, parfaits and frappes.

Cream fillings are one example of dessert fillings. The cream fillings can be used in foods such as snack cakes and other baked goods. The present fatty composition can also be used to make confectionery center cream fillings, for example, chocolate or vanilla fillings.

Reduced calorie cream cheese can also be made according to the present invention. Also included within the present food products are processed meats in which the fat can be replaced by the present shortening, for example, bologna, salami or sausage.

Snack dips and snack toppings can be made with the present fatty composition. Also included are prepared pie crusts.

A preferred table spread according to the present invention comprises from about 95% to about 99% by weight fatty composition of the invention, from about 0.5% to about 2% by weight salt, from about 0.2% to about 2% by weight flavorings, and from about 0.001% to about 1% by weight minors.

The foods of the invention can be refrigerated, room temperature, microwaved, canned, or processed by another conventional method.

The portion of the foods that doesn't comprise the present fatty composition will comprise conventional food ingredients—whatever ingredients are appropriate for the particular food.

ANALYTICAL METHODS

I.

Viscosity Measurement of the Sugar or Sugar Alcohol Fatty Acid Polyesters

A. Sample Preparation

The polyester sample is melted in a hot water bath at greater than 190° F. (87.0° C.). The melted polyester is thoroughly mixed and ten grams of the melted sample is weighed into a vial. The vial is covered and then heated in a hot water bath to greater than 190° F. (87.8° C.). The sample is then allowed to recrystallize at 100° F.±5° F. (37.8° C. ±3° C.) for 24 hours in a constant temperature room. After the 24 hour time period has elapsed, the sample is taken to the viscometer and the viscosity is measured.

B. Ferranti-Shirley Viscometer Operation Procedure

A Ferranti-Shirley viscometer (Ferranti Electric, Inc., 87 Modular Ave., Commack, N.Y. 11725) equipped with a 600 g torque spring is used for the viscosity measurement. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds. The test is started by selecting the rpm for 10 seconds$^{-1}$ shear rate and recording on the strip chart recorder. The shear stress is recorded at 10 minutes after the point at which the shear stress reaches the maximum value. Viscosity (poise) = shear stress (dynes/cm$^2$) divided by shear rate (seconds$^{-1}$).

II.

Liquid/Solid Stability Measurement of the Sugar or Sugar Alcohol Fatty Acid Polyesters The sample of the test composition is heated in a hot water bath at greater than 190° F. (87.8° C.) until it completely melts and is then thoroughly mixed. The sample is then poured into centrifuge tubes at 100° F. (37.8° C.). The samples then are allowed to recrystallize for 24 hours at 100° F. (37.8° C.) in a constant temperature room. The samples are then centrifuged at 60,000 rpm for one hour at 100° F. (37.8° C.). The force on the samples is 486,000 g's. The percent liquid separated is then measured by comparing the relative heights of the liquid and solid phases. Liquid/solid stability (%) = 100 ×(total volume of sample - volume of liquid that separated)/total volume of sample.

III.

Solid Fat Content Measurement

Before determining SFC values, the sugar or sugar alcohol fatty acid polyester sample is heated to a temperature of 158° F. (70° C.) or higher for at least 0.5 hours or until the sample is completely melted. The melted sample is then tempered at a temperature of 40° F. (4.4° C.) for at least 72 hours. After tempering, the SFC value of the sample at a temperature of 100° F. (37.8° C.) is determined by pulsed magnetic resonance. The method for determining SFC values by pulsed magnetic resonance is described in Madison and Hill, *J. Amer. Oil Chem. Soc.*, vol. 55 (1978), pp. 328-31 (herein incorporated by reference). Measurement of SFC by pulsed magnetic resonance is also described in A.O.C.C. Official Method Cd. 16-81, *Official Methods and Recommended Practices of The American Oil Chemists Society.* 3rd Ed., 1987 (herein incorporated by reference).

IV.

Fatty Acid Composition

Fatty acid composition (FAC) of sugar or sugar alcohol fatty acid polyester sample is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure Ce 1-62.

V.

Ester Distribution of Polyesters

The relative distribution of the individual octa-, hepta-, hexa- and penta- esters, as well as collectively the tetra- through mono- esters, of the polyester samples can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e., an evaporative light scattering detector). The detector response is measured and then normalized to 100%. The individual ester groups are expressed as a relative percentage.

VI.

Method for Measuring Volume of Edible Gas in the Fatty Composition

A cup having a known weight and volume is used for the measurement. The fatty composition is heated at a temperature above its melting point until it is completely melted. (Sugar or sugar alcohol fatty acid polyesters are heated at a temperature above 190° F. (87.8° C.).) The cup is filled with the melted fatty composition and weighed. An identical cup is filled with unmelted fatty composition at room temperature (70° F., 21° C.) and weighed. The weights of unmelted and melted fatty composition are determined by substracting the weight of the cup from the total weight. Then the percent of edible gas in the fatty composition is calculated as follows:

Percent edible gas =

$$100\% \text{ minus} \left( \frac{\text{weight unmelted composition}}{\text{weight melted composition}} \right)$$

The following examples are intended only to further illustrate the invention and are not intended to limit the scope of the invention which is defined by the claims.

EXAMPLE 1

Samples of Crisco shortening and sucrose fatty acid polyester shortening are highly aerated by injection with nitrogen gas. Crisco is a conventional triglyceride shortening made by partially hydrogenating soybean oil and palm oil (manufactured by Proctor & Gamble, Cincinnati, Ohio). The sucrose fatty acid polyester shortening contains the following ingredients:

| Ingredient | % |
| --- | --- |
| Intermediate melting sucrose fatty acid polyesters* | 28.0 |
| Hardstock sucrose fatty acid polyesters** | 5.0 |
| Liquid soybean oil, I.V. 107 | 58.5 |
| Hardstock palm oil, I.V. <4 | 4.0 |
| Mono- and diglyceride emulsifier | 4.5 |

*The intermediate melting sucrose polyesters are made from a blend of partially hardened (I.V. 107) and nearly completely hardened (I.V. 8) soybean oil methyl esters, in a 45:55 ratio. The polyesters have the following properties: 90.7% octaester, 9.3% heptaester; SFC of 64.8% at 50° F. (10° C.), 52.4% at 70° F. (21° C.), 39.3% at 80° F. (27° C.), 20.7% at 92° F. (33° C.), and 5.4% at 105° F. (41° C.); fatty acid composition of 11.7% $C_{16}$, 61.2% $C_{18}$, 12.6% $C_{18:1}$, and 14.5% $C_{18:2}$; iodine value of 36; viscosity of 88.6 poise at 100° F. (37.8° C.) after 10 minutes of steady shear at a shear rate of 10 seconds$^{-1}$; and liquid/solid stability at 100° F. (37.8° C.) of 93%.

**The hardstock sucrose polyesters, made from nearly completely hardened soybean oil methyl esters, have the following properties: 92.4% octaester, 7.6% heptaester; SFC of greater than 90% at 50° F. (10° C.), 91.1% at 70° F. (21° C.), 92.2% at 80° F. (27° C.), 87.8% at 92° F. (33° C.), and 69.1% at 105° F. (41° C.); fatty acid composition of 9.6% $C_{16}$, 87.3% $C_{18}$, 1.5% $C_{18:1}$, 0.4% $C_{18:2}$, and 0.5% $C_{20}:C_{18:1}$; iodine value of 1.9.

Nitrogen is injected into the shortenings by the use of a Gerstenberg & Agger high pressure nitrogen injection system, Labo-Perfector Type 4-57 R22 (Gerstenberg &

Agger Company, 19, Frydendalsvej, DK 1800 Copenhagen V, Denmark). The G&A system consists of a mix tank, an oil line for flow of the oil from the tank, a pressurizing pump connected to the oil line, an injection port for injection of nitrogen into the oil line from a pressurized tank, then a static heat exchanger to crystallize the oil, followed by two picker boxes in sequence to impart mechanical work to the oil for good consistency of the shortening, and then an outlet valve.

Using similar processing conditions, and using a nitrogen pressure between 560 and 575 psi, the Crisco shortening is aerated to a level of 46.8% nitrogen by volume of the shortening, and the sucrose fatty acid polyester shortening is aerated to a level of 54.7% nitrogen by volume. The shortenings are tempered at 85° F. (29° C.) for 24 hours, then stored at 70° F. (21° C.).

The highly aerated Crisco shortening has a slumped and nonuniform appearance after tempering (and also after storage). A large coalescence of gas bubbles occurs. In contrast, after tempering, then storage at 70° F. (21° C.) for 24 hours, the highly aerated sucrose polyester shortening has a smooth, creamy and uniform appearance. No slumping occurs. The sucrose polyester shortening retains this good appearance and texture after six months.

EXAMPLE 2

A butter-flavored table spread is prepared from the following ingredients:

| Ingredient | % |
| --- | --- |
| Sucrose fatty acid polyester shortening of Example 1 | 98.8% |
| Salt | 0.8% |
| Dairy flavor, cooked butter type | 0.4% |
| Beta carotene | 0.002% |

The butter-flavored spread can be used as a replacement for margarine or butter. It spreads well, has a creamy, smooth appearance, and is largely resistant to slump and collapse when stored at room temperature for up to about six months. In addition, it is more microbiologically shelf stable than butter or margarine because it contains no water.

EXAMPLE 3

Highly aerated sucrose fatty acid polyester shortenings are prepared as described in Example 1. One shortening is aerated to 51% nitrogen, and another is aerated to 60% nitrogen. An experiment is conducted to compare the melting rates of these shortenings with the melting rates of butter and margarine, when these toppings are placed onto hot baked potatoes. Potatoes of similar size are placed into a microwave oven and baked. Upon completion of baking, the potatoes are split lengthwise and slightly compressed from the ends. The toppings are placed onto the potatoes and timed for complete melting. The results obtained are illustrated in the following Table I. Timing is stopped when the toppings are completely melted.

TABLE I

| Potato Wt. | Topping Wt. | Temperature | Time |
| --- | --- | --- | --- |
| 51% $N_2$ Sucrose Polyester Shortening | | | |
| 119.9 g | 3.7 g | 208° F. (98° C.) | 0 sec. |
| | | 206° F. (97° C.) | 15 |
| | | 205° F. (96° C.) | 30 |

TABLE I-continued

| Potato Wt. | Topping Wt. | Temperature | Time |
| --- | --- | --- | --- |
| | | 203° F. (95° C.) | 45 |
| | | 201° F. (94° C.) | 60 |
| | | 199° F. (93° C.) | 75 |
| 60% $N_2$ Sucrose Polyester Shortening | | | |
| 117.8 g | 3.5 g | 209° F. (98° C.) | 0 sec. |
| | | 207° F. (97° C.) | 15 |
| | | 206° F. (97° C.) | 30 |
| | | 205° F. (96° C.) | 45 |
| | | 204° F. (96° C.) | 60 |
| | | 203° F. (95° C.) | 70 |
| Butter | | | |
| 117.7 g | 5.0 g | 203° F. (95° C.) | 0 sec. |
| | | 200° F. (93° C.) | 15 |
| | | 199° F. (93° C.) | 30 |
| | | 195° F. (91° C.) | 45 |
| | | 192° F. (89° C.) | 60 |
| Margarine | | | |
| 103 g | 4.7 g | 205° F. (96° C.) | 0 sec. |
| | | 203° F. (95° C.) | 15 |
| | | 200° F. (93° C.) | 30 |
| | | 196° F. (91° C.) | 45 |
| | | 193° F. (89° C.) | 50 |

From these results, it is concluded that highly aerated sucrose polyester shortenings of the present invention are suitable for use as a topping for potatoes or other hot vegetable. While the shortenings do not melt as rapidly as the butter and margarine, the shortenings melt within an acceptable time (about 70-75 seconds). Moreover, most of the volume of the shortenings melts soon after the shortenings are applied to the potatoes, in much the same way as the butter and margarine melt. A sour cream and chives flavor or butter flavor can be added to the shortenings to enhance their taste on potatoes.

What is claimed is:

1. A fatty composition comprising:
   (a) at least about 20% by weight fat substitute selected from the group consisting of sugar fatty acid polyesters and sugar alcohol fatty acid polyesters, and mixtures thereof, wherein the sugars and sugar alcohols contain from 4 to 8 hydroxyl groups, wherein the polyesters contain at least four fatty acid ester groups, and wherein each fatty acid group has from about 2 to about 24 carbon atoms;
   (b) not more than about 80% by weight fatty composition ingredients selected from the group consisting of triglyceride fats, fat substitutes other than the sugar fatty acid polyesters and sugar alcohol fatty acid polyesters of part (a) hereinabove, emulsifiers, flavorings, colorings, anti-spattering agents, anti-sticking agents, anti-oxidants, an mixtures thereof;
   (c) wherein the fatty composition additionally comprises from about 25% to about 75% by volume edible gas dispersed uniformly in the fatty composition; and
   (d) wherein the fat substitute of part (a) hereinabove has a viscosity of at least about 0.5 poise at 100° F. (37.8° C.) after 10 minutes of steady shear at a shear rate of 10 seconds$^{-1}$, and a liquid/solid stability at 100° F. (37.8° C.) of at least about 30%.

2. A fatty composition according to claim 1 comprising from about 25% to about 65% by volume edible gas.

3. A fatty composition according to claim 2 comprising from about 35% to about 65% by volume edible gas.

4. A fatty composition according to claim 1 wherein the edible gas is selected from the group consisting of air, nitrogen, carbon dioxide, nitrous oxide, octafluorocyclobutane, and mixtures thereof.

5. A fatty composition according to claim 1 comprising between about 20% by weight and about 55% by weight fat substitute.

6. A fatty composition according to claim 1 wherein the fat substitute additionally comprises sufficient antianal leakage agent to prevent leakage of the fat substitute.

7. A fatty composition according to claim 1 wherein the fat substitute has a liquid/solid stability of at least about 50%.

8. A fatty composition according to claim 1 wherein the fat substitute has a viscosity of at least about 5 poise at 100° F. (37.8° C.) after 10 minutes of steady shear at a shear rate of 10 seconds$^{-1}$.

9. A fatty composition according to claim 1 wherein the fat substitute has a solid fat content of at least about 3% at 100° F.

10. A fatty composition according to claim 1 wherein the fat substitute is a sucrose fatty acid polyester.

11. A fatty composition according to claim 10 wherein at least about 85% of the sucrose fatty acid polyesters are selected from the group consisting of octaesters, heptaesters, hexaesters, and mixtures thereof.

12. A fatty composition according to claim 10 wherein no more than about 3% of the sucrose fatty acid polyesters are selected from the group consisting of penta- and lower esters, and mixtures thereof.

13. A fatty composition according to claim 1 wherein the conventional fatty composition ingredients comprise triglyceride fats.

14. A fatty composition according to claim 13 comprising from about 20% to about 55% fat substitute about 45% to about 80% triglyceride fat.

15. A fatty composition according to claim 14 comprising from about 25% to about 50% fat substitute about 50% to about 75% triglyceride fat.

16. An aerated food product comprising at least about 10% by weight fatty composition of claim 1, wherein the food product is selected from the group consisting of vegetable toppings, table spreads, mousses, frostings, custards, puddings, dessert fillings, dessert toppings, frozen desserts, confectionary fillings, cream cheese, processed meats, snack dips, and snack toppings.

17. A table spread according to claim 16.

18. A table spread according to claim 17 comprising from 95% to about 99% by weight fatty composition of claim 1, from about 0.5% to about 2% by weight salt, from about 0.2% to about 2% by weight flavorings, and from about 0.001% to about 1% by weight minors.

19. A vegetable topping according to claim 16.

20. A shortening comprising:
(a) from about 10% to about 50% by weight intermediate melting fat substitute selected from the group consisting of sugar fatty acid polyesters and sugar alcohol fatty acid polyesters, and mixtures thereof, wherein the intermediate melting polyesters have an iodine value between about 25 and about 55, wherein the sugars and sugar alcohols contain from 4 to 8 hydroxyl groups, wherein the polyesters contain at least 4 fatty acid ester groups, and wherein each fatty acid group has from about 2 to about 24 carbon atoms;
(b) from about 5% to about 15% by weight hardstock selected from the group consisting of hardstock triglycerides, hardstock sugar fatty acid polyesters, hardstock sugar alcohol fatty acid polyesters, and mixtures thereof, wherein the hardstock has an iodine value not more than about 12, wherein the sugars and sugar alcohols contain from 4 to 8 hydroxyl groups, wherein the polyesters contains at least 4 fatty acid ester groups, and wherein each fatty acid group has from about 2 to about 24 carbon atoms;
(c) from about 40% to about 80% by weight soft oil selected from the group consisting of soft oil triglycerides, soft oil sugar fatty acid polyesters, soft oil sugar alcohol fatty acid polyesters, and mixtures thereof, wherein the soft oil triglycerides have an iodine value between about 70 and about 130 and the soft oil polyesters have an iodine value between about 60 and about 130, wherein the sugars and sugar alcohols contain from 4 to 8 hydroxyl groups, wherein the polyesters contain at least 4 fatty acid ester groups, and wherein each fatty acid group has from about 2 to about 24 carbon atoms;
(d) and from about 1% to about 10% by eight emulsifier;
(e) wherein the shortening additionally comprises from about 25% to about 75% by volume edible gas dispersed uniformly in the shortening;
(f) wherein the fat substitute of part (a) hereinabove has a viscosity of at least about 0.5 poise at 100° F. (37.8° C.) after 10 minutes of steady shear at a shear rate of 10 seconds$^{-1}$, and a liquid/solid stability at 100° F. (37.8° C.) of at least about 30%.

21. A shortening according to claim 20 wherein the polyester is a sucrose fatty acid polyester.

* * * * *